S. KAKELES.
Fluid Lense.
No. 989.
Reissued June 26, 1860.
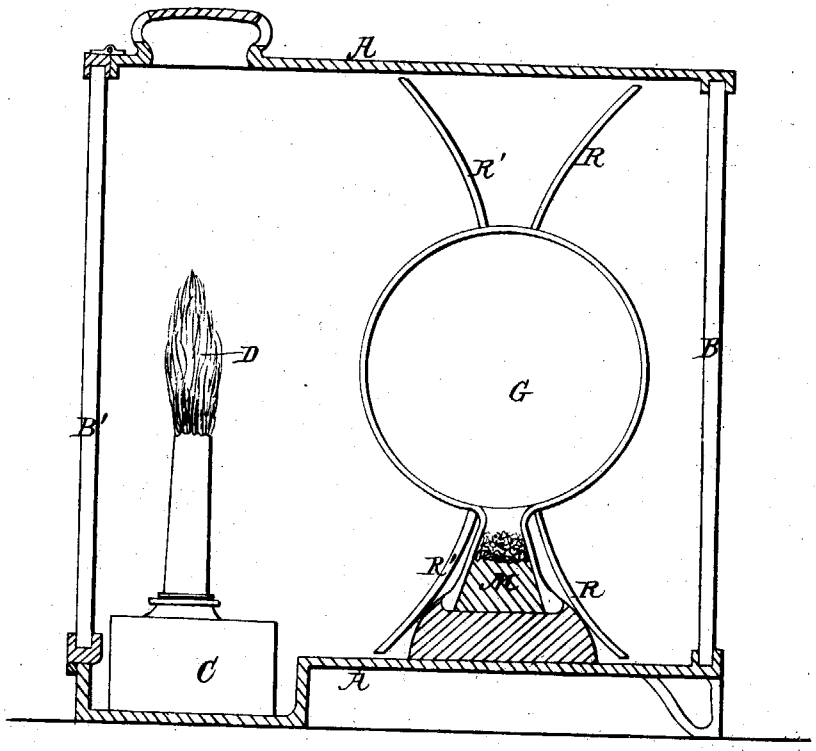
Witnesses
Henry A. Borden
James H. Bondron
Inventor
S. Kakeles
N. PETERS, Photo-Lithographer, Washington, D. C.

UNITED STATES PATENT OFFICE.

SELIGMAN KAKELES, OF NEW YORK, N. Y.

IMPROVEMENT IN FLUID LENSES.

Specification forming part of Letters Patent No. 27,988, dated April 24, 1860; Reissue No. 989, dated June 26, 1860.

*To all whom it may concern:*

Be it known that I, SELIGMAN KAKELES, of New York, in the county and State of New York, have invented a new and Improved Signal-Lantern; and I do hereby declare that the following is a full and exact description thereof, reference being had to the accompanying drawing, and to the letters of reference marked thereon.

The nature of my invention consists in the use and application of a magnet or its equivalent in the bottom of the glass globe when said globe is filled with a colored liquid, whereby the mineral particles with which the liquid has been colored, and which may not be quite dissolved, will be attracted, and thereby prevent the fluid from becoming cloudy or turbid by the vibratory motion of the car or carriage to which said lantern may be fixed; and, further, in arranging in a lantern provided at front and back with glass sides a glass cylinder or globe filled with colored liquid and surrounding said globe with two reflectors facing opposite directions, whereby one single flame or light, placed either behind or before and in proper distance from said globe, will be reflected in two opposite directions, and in such a manner as to show a white light in one direction and a colored light in the other direction.

In the accompanying drawing, which represents a longitudinal section of my improved signal-lantern, A represents the lantern or casing, provided at its front and back sides with colorless glass sides B B′.

C is a lamp of any desired description, fastened into the lantern and arranged only for one flame, D.

G is a glass globe filled with a colored liquid, and firmly fastened in the lantern at a height corresponding with the flame D, and situated some distance in front of said lamp and flame. Near the middle of the glass globe G two reflectors, R R′, are fastened all around said glass globe G, facing opposite directions, one toward the front and one toward the back of the lantern. When the flame D is lighted the light will be reflected from the reflector R′ through the back of the lantern B′, while the rays passing in front through the colored liquid in the glass globe G will concentrate in the reflector R, and be reflected by the same through the front of the lantern B.

If the glass globe G is filled with a red, blue, green, or any other color liquid, the light reflected through the front of the lantern will naturally correspond with the color in the glass globe G, while the light reflected through the back B, of the lantern will be colorless, or only corresponding to the natural color of the flame itself.

In case a lantern as hereinbefore described should be attached into the forward or after end of a railway-car, a powerful colored light will be reflected and shown on the outside, while a colorless light will be thrown into the inside of the car for the purpose of illuminating the inside.

The colored liquid in the glass globe is generally produced by the solution in acids of the suitable metallic oxide giving the required color. The continual vibratory motion of the car or carriage would very soon make this colored liquid cloudy or turbid and prevent thereby a clear light being emitted. To prevent this and to keep the liquid always clear, I insert into the bottom of the glass globe a magnet, by which all undissolved metallic particles are attracted, and consequently the liquid kept clear.

Instead of a magnet, magnet-filings mixed with shellac and beeswax may be made into a composition and placed in the bottom of the globe, or may be used to stop up the hole through which the globe has been filled, and turned then toward the bottom or lower side, as represented at M.

What I claim as my invention, and desire to secure by Letters Patent, is—

1. The application and use of a magnet or its equivalent in the bottom of a glass globe filled with a colored fluid, for the purpose as herein set forth.

2. The arrangement and combination, in a lantern, of a light and glass globe filled with a colored liquid, when said globe is surrounded by two reflectors facing opposite directions, and when said light is placed either before or behind the glass globe, so as to produce and reflect by the use of only one light a colored light in one direction and a white or colorless light in the opposite direction, in the manner substantially as described.

S. KAKELES.

Witnesses:

HENRY E. ROEDER,

JAMES H. DAVIDSON.